(12) United States Patent
Woo

(10) Patent No.: US 10,190,574 B2
(45) Date of Patent: Jan. 29, 2019

(54) SYSTEM AND METHOD FOR CONTROLLING GENERATION OUTPUT QUANTITY OF A WIND POWER PLANT USING DUST DETECTOR

(71) Applicant: DOOSAN HEAVY INDUSTRIES & CONSTRUCTION CO., LTD., Gyeongsangnam-do (KR)

(72) Inventor: Sang Woo Woo, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 492 days.

(21) Appl. No.: 14/522,313

(22) Filed: Oct. 23, 2014

(65) Prior Publication Data

US 2015/0152845 A1    Jun. 4, 2015

(30) Foreign Application Priority Data

Dec. 2, 2013    (KR) .................. 10-2013-0148290

(51) Int. Cl.
| | |
|---|---|
| F03D 7/04 | (2006.01) |
| F03D 17/00 | (2016.01) |
| F03D 7/02 | (2006.01) |
| F03D 9/25 | (2016.01) |

(52) U.S. Cl.
CPC ............ *F03D 7/048* (2013.01); *F03D 7/028* (2013.01); *F03D 9/257* (2017.02); *F03D 17/00* (2016.05); *Y02E 10/723* (2013.01)

(58) Field of Classification Search
None
See application file for complete search history.

(56) References Cited

U.S. PATENT DOCUMENTS 6,890,152 B1 *   5/2005  Thisted .................. F03D 80/40
                                                                  416/1
2009/0295159 A1 * 12/2009  Johnson ................ F03D 7/0224
                                                                  290/44
(Continued)

FOREIGN PATENT DOCUMENTS

| JP | 2001-349775 A | 12/2001 |
|---|---|---|
| JP | 2002-349412 A | 12/2002 |

(Continued)

OTHER PUBLICATIONS

Mohseni et al. 'Simultaneous monitoring of ice accretion and thermography of an airfoil: an IR imaging methodology' Meas. Sci. Technol. 23 (2012) 105405.*

(Continued)

*Primary Examiner* — Mohammad Ali
*Assistant Examiner* — Bernard G Lindsay
(74) *Attorney, Agent, or Firm* — Invenstone Patent, LLC

(57) ABSTRACT

A method of controlling a wind power plant having a plurality of wind power generators includes monitoring the generation state of the wind power plant, analyzing the generation quantity reduction factor of a wind power generator if that generator has a reduced generation output quantity, and individually controlling the generation output quantity of that wind power generator based on the analyzed generation quantity reduction factor so that the generation output quantity is increased.

13 Claims, 12 Drawing Sheets

(56) References Cited

U.S. PATENT DOCUMENTS

| | | | |
|---|---|---|---|
| 2010/0054940 A1* | 3/2010 | Honhoff | F03D 1/003 416/31 |
| 2010/0138201 A1* | 6/2010 | Gundling | F03D 1/006 703/9 |
| 2011/0187106 A1* | 8/2011 | Ichinose | F03D 7/048 290/44 |
| 2011/0270450 A1* | 11/2011 | Gujjar | G06Q 10/00 700/287 |
| 2012/0053984 A1* | 3/2012 | Mannar | G06Q 50/06 705/7.28 |
| 2012/0104754 A1* | 5/2012 | Rudolf | F03D 7/0284 290/44 |
| 2012/0139246 A1* | 6/2012 | Rafoth | F03D 9/003 290/44 |
| 2012/0257968 A1* | 10/2012 | Dalsgaard | F03D 7/0264 416/1 |
| 2013/0214534 A1* | 8/2013 | Nakamura | F03D 7/00 290/44 |
| 2013/0220005 A1* | 8/2013 | Kawano | G01M 15/14 73/112.01 |
| 2014/0103653 A1* | 4/2014 | Ubben | F03D 7/048 290/44 |
| 2014/0241878 A1* | 8/2014 | Herrig | F03D 7/0224 416/1 |
| 2014/0267693 A1* | 9/2014 | Newman | G06T 7/0004 348/128 |

FOREIGN PATENT DOCUMENTS

| | | |
|---|---|---|
| JP | 2004-19583 A | 1/2004 |
| JP | 2004-339953 A | 12/2004 |
| JP | 2009-92008 A | 4/2009 |
| JP | 2011-200040 A | 10/2011 |
| JP | 2013-139734 A | 7/2013 |
| JP | 2013-222423 A | 10/2013 |
| KR | 1020130078680 | 7/2013 |

OTHER PUBLICATIONS

Office Action issued in corresponding Japanese Application No. 2014-219408, dated Nov. 22, 2016, 4 pages.

A Japanese Office Action dated Aug. 7, 2018 in connection with Japanese Patent Application No. 2014-219408.

* cited by examiner

SYSTEM AND METHOD FOR CONTROLLING GENERATION OUTPUT QUANTITY OF A WIND POWER PLANT USING DUST DETECTOR

CROSS-REFERENCES TO RELATED APPLICATIONS

The present application claims priority under 35 U.S.C 119(a) to Korean Application No. 10-2013-0148290, filed on Dec. 2, 2013, in the Korean Intellectual Property Office, which is incorporated herein by reference in its entirety as if set forth in full.

BACKGROUND

Exemplary embodiments of the present disclosure relate to the improvement of the generation output quantity of a wind power generator, and more particularly, to a method of controlling the generation output quantity of a wind power plant, which may improve the generation output quantity of a wind power plant by patterning a reduction in the generation output quantity of a plurality of wind power generators installed in the wind power plant or a generation output quantity reduction state due to the lapse of time after the wind power plant is installed.

In general, wind power generation is a technology in which wind power is converted into mechanical energy by rotating a rotor using the aerodynamic characteristic of kinetic energy in the flow of air. Induction electricity is generated by the mechanical energy and supplied to a power system or to supply the needs of other power consumers. Such wind power generation technology is a clean and eco-friendly generation method because wind resources (e.g., the wind) are an abundant and renewable energy source and do not discharge pollution.

Disadvantages of wind power generation include restrictions on the specific areas where wind power generators are installed because power generation is limited or impossible if the wind is infrequent or has a low energy density. However, wind power generation has the advantage that power generation is plentiful if a proper amount of wind is present.

A wind power generator may be a horizontal type or a vertical type depending on the direction of a rotation shaft with respect to the ground. The wind power generator includes a rotor with a blade and a hub, a gearbox configured to drive a generator by accelerating rotation, the generator being configured to produce electricity, a control device configured to control various safety devices, a brake device, a power control device, and a steel tower.

In wind power generation having such characteristics, in order to evenly maintain a total generation output quantity of a wind power plant, a plurality of wind power generators are included and each of the wind power generators needs to be stably driven.

If dust or foreign substances are adhered to the wind power generators installed in the wind power plant, generation output is reduced due to an increase of resistance attributable to the rotation of the blades. Generation output quantity may also be reduced due to changes in the weather at the location where the wind power plant is installed. Furthermore, the generation output quantity of a wind power plant may be reduced over time after the wind power plant is installed. Accordingly, there is a need for an improved method of controlling a generation output quantity.

BRIEF SUMMARY

An embodiment of the present disclosure relates to improving generation output quantity by analyzing a reduction factor of the generation quantity if the generation output quantity is reduced in a plurality of wind power generators installed in a wind power plant, and improving generation output quantity by forming a generation quantity reduction pattern due to the lapse of time if a total generation output quantity of a wind power plant is reduced and using the patterned generation quantity reduction pattern in controlling the generation output quantity.

In one embodiment, a method of controlling the generation output quantity of a wind power plant includes monitoring the generation state of the wind power plant including a plurality of wind power generators, analyzing the generation quantity reduction factor of a wind power generator that has a reduced generation output quantity and that belongs to the plurality of wind power generators if the generation output quantity of the wind power generator is reduced, and individually controlling the generation output quantity of the wind power generator having the reduced generation output quantity based on the analyzed reduction factor so that the generation output quantity is increased.

Monitoring the generation state of the wind power plant may include receiving current weather information about the area where the wind power plant is installed and weather information after an elapsed time period and monitoring the generation quantity of the wind power plant over time based on the received weather information.

Monitoring the generation state of the wind power plant may include partitioning the wind power plant into zones, subdividing the generation state of each of the partitioned zones into yearly, monthly, and weekly units, and monitoring the generation state at daytime and at night.

Analyzing the generation quantity reduction factor may include checking whether or not contaminants have attached to the blade of the wind power generator, checking whether or not the rotational velocity of the blade has been reduced, whether or not vibration has been generated in the blade, and whether or not the weight of the blade has increased, and checking weather conditions around the wind power plant.

Checking whether or not contaminants have attached to the blade of the wind power generator may include partitioning the wind power plant into a plurality of zones and comparing the attachment degrees of the contaminants in the partitioned zones with each other.

Analyzing the generation quantity reduction factor may include selectively using a method of detecting a reduction of the generation output quantity of the wind power generator using a first sensor installed in each of the wind power generators and a method of partitioning the wind power plant into zones and detecting a reduction of the generation output quantity of the wind power generator using a second sensor installed in a representative wind power generator of each of the partitioned zones.

Checking whether or not contaminants have attached to the blade of the wind power generator may include checking the size and area of dust attached to the blade if the contaminants attached to the blade are the dust.

Checking the weather conditions around the wind power plant may include checking a wind velocity and a wind volume around the wind power generator having the reduced generation output quantity.

Individually controlling the generation quantity of the wind power generator may include changing the surface roughness of a blade of the wind power generator having the reduced generation output quantity and computing lifting force and drag force again, applying the re-computed lifting force and drag force to the wind power generator having the reduced generation output quantity, and controlling the tilt angle of the blade of the wind power generator having the reduced generation output quantity.

Individually controlling the generation output quantity of the wind power generator may include rotating the blade of the wind power generator having the reduced generation output quantity by increasing output of the wind power generator.

Individually controlling the generation quantity of the wind power generator may include controlling the wind power generator having the reduced generation output quantity by increasing the rotational velocity of the wind power generator for a specific period and controlling the increased rotational velocity of the wind power generator in the normal state if the generation state of an adjacent wind power generator maintains a reference generation output quantity after a lapse of a time period.

Controlling the tilt angle of the blade may include controlling the tilt angle of the blade using any one of an automatic method and a manual method.

In another embodiment, a method of controlling the generation output quantity of a wind power plant includes monitoring the generation state of the wind power plant based on periods of time after the wind power plant is driven, subdividing and patterning a generation quantity reduction pattern of wind power generators having reduced generation output quantities by time intervals if the generation output quantity of the wind power plant is reduced entirely or partially, and controlling the generation output quantity of the wind power plant based on the generation quantity reduction pattern so that the generation output quantity is increased.

Monitoring the generation state of the wind power plant may include monitoring the generation state of the wind power plant according to daily, monthly, and yearly time periods in the area where the wind power plant is located.

Subdividing and patterning the generation quantity reduction pattern may include subdividing whether or not contaminants have been attached to the blades of the wind power generators placed in the wind power plant according to the zones of the wind power generators placed in the wind power plant, checking the contaminant attachment states of the blades according to specific periods after contaminants attached to the blades are fully removed, and checking and recording a change of the contaminants.

Controlling the generation quantity of the wind power plant may include controlling tilt angles of blades of the wind power generators having the reduced generation output quantities differently by periods.

Controlling the generation output quantity of the wind power plant may include controlling the generation output quantity of the wind power plant in conjunction with yearly weather information of an area where the wind power plant is located.

Controlling the generation output quantity of the wind power plant may include controlling an amount of current applied to rotors of the wind power generators having the reduced generation output quantities differently by time intervals.

Controlling the tilt angles of the blades may include controlling the blades at a first tilt angle after a lapse of a first period, controlling the blades at a second tilt angle after a lapse of a second period, and controlling the blades at a third tilt angle after a lapse of a third period.

The tilt angle of the blade may be increased from the first tilt angle to the third tilt angle.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Figure 1:
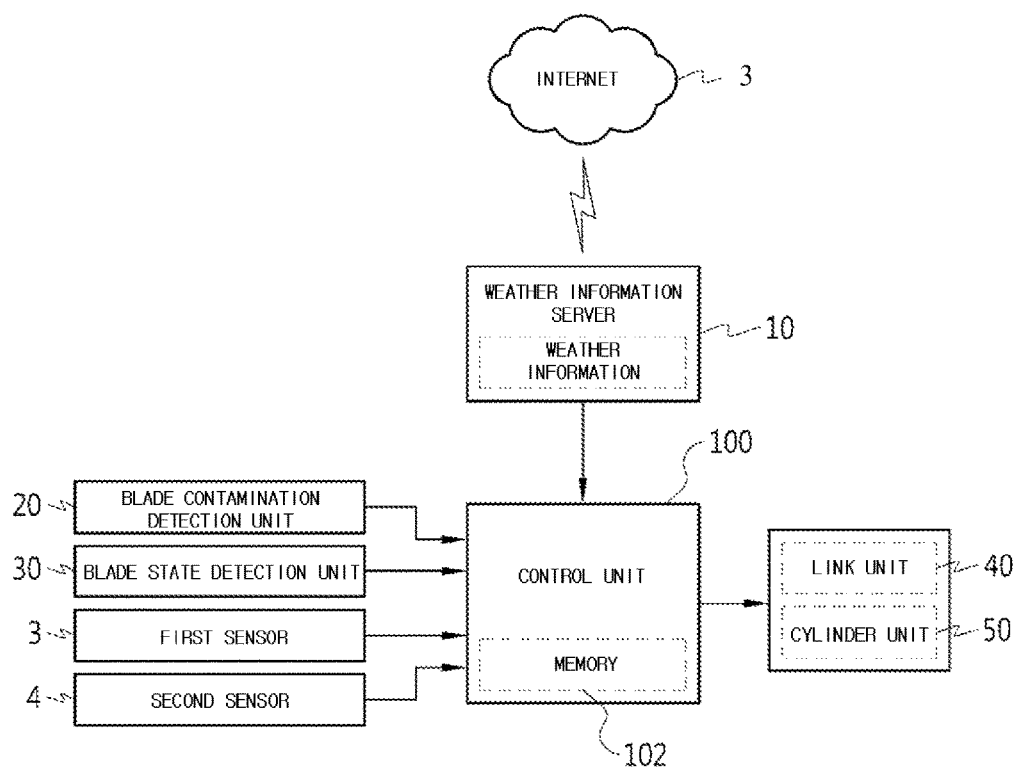
FIG. 1 is a block diagram showing a control unit configured to perform a method of controlling the generation output quantity of a wind power plant and elements associated with the control unit in accordance with an embodiment of the present disclosure.
Figure 2:
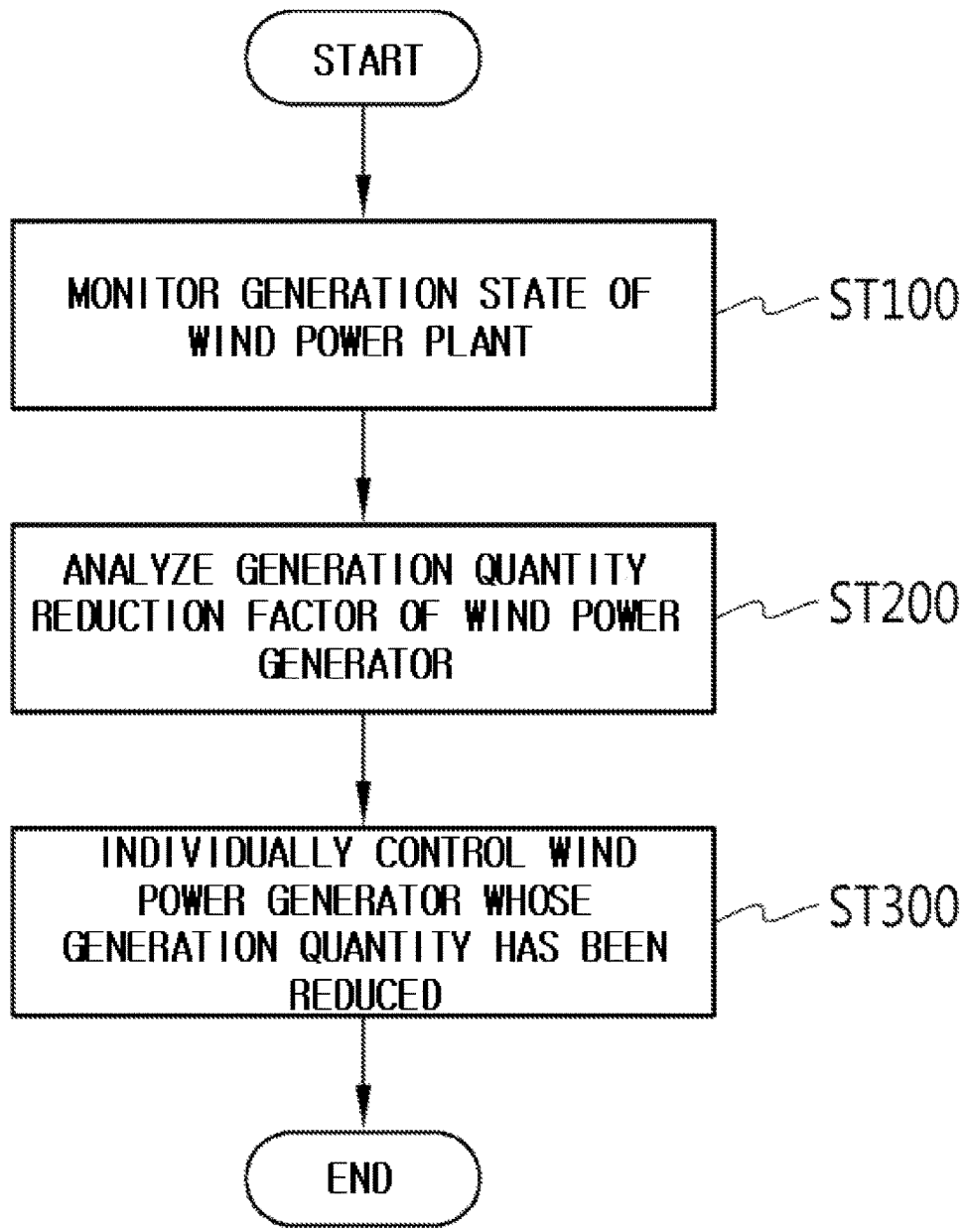
FIG. 2 is a flowchart illustrating a method of controlling the generation output quantity of a wind power plant in accordance with an embodiment of the present disclosure.

Hereinafter, embodiments of the present disclosure will be described with reference to the accompanying drawings.

A method of controlling the generation output quantity of a wind power plant in accordance with an embodiment of the present disclosure is described below with reference to FIGS. 1 to 4.

Referring to FIGS. 1 to 4, a method of controlling the generation output quantity of a wind power plant according to an embodiment of the present disclosure includes controlling a generation output quantity based on the generation state of the entire wind power plant that includes a plurality of wind power generators installed on land or in sea, analyzing a generation quantity reduction factor in order to improve generation performance if the generation output quantity of each wind power generator or the wind power plant is reduced, and individually controlling the generation output quantity of each wind power generator having a reduced generation output quantity based on the analyzed data.

More particularly, the method of controlling the generation output quantity of a wind power plant according to the present embodiment includes monitoring the generation state of a wind power plant 1 including a plurality of wind power generators 1*a* at step ST100, analyzing a generation quantity reduction factor of a specific wind power generator 1*a* that belongs to the plurality of wind power generators 1*a* and has a reduced generation output quantity if the generation output quantity of the specific wind power generator 1*a* is reduced at step ST200, and individually controlling the generation output quantity of the specific wind power generator 1*a* having the reduced generation output quantity based on the analyzed reduction factor so that the generation output quantity of the specific wind power generator 1*a* is increased at step ST300.

In order to monitor the generation state of the wind power plant 1, a weather information server 10 sends weather information to a control unit 100. The control unit 100 is configured to integrally control the wind power plant 1 in real time. The control unit 100 stores the received weather information as information for controlling the generation output quantity of the wind power plant 1.

The weather information server 10 receives weather information in real time over the Internet 3 and provides the weather information to an administrator. The weather information includes weather data, such as the temperature, humidity, direction of the wind, and wind velocity of an area where the wind power plant 1 is installed.

In particular, major data related to the generation output quantity of the wind power plant 1 includes weather data, such as the direction of the wind and a wind velocity. The weather information is stored in memory 102.

The control unit 100 receives weather information after an 'n' time along with current weather information of an area where the wind power plant 1 is installed at step ST110. The control unit 100 monitors the generation output quantity of the wind power plant 1 over a time interval in real time based on the received weather information at step ST120.

The control unit 100 receives current weather information, provides an administrator with weather condition information around the wind power plant 1 in which the plurality of wind power generators 1*a* are installed, and calculates the average by monitoring the generation state over a time interval.

In accordance with an embodiment for monitoring a generation state of the wind power plant 1 at step ST100, the wind power plant 1 may be partitioned into a plurality of zones, and a generation state of each of the partitioned zones may be categorized by years, months, and weeks and monitored at daytime and at night.

For example, if the wind power plant 1 has a relatively large area, the wind power generators 1*a* may be disposed at relatively large intervals. The generation state of the wind power generators 1*a* may be changed depending on the installation intervals, weather conditions, and surrounding environment.

In the present embodiment, the generation state may be monitored more precisely by dividing one year into months, each of the months into weeks, and each day of the week into daytime and night. Accordingly, the reliability of monitoring data obtained according to the generation state of the wind power plant 1 can be improved because monitoring of a change of a season or a lapse of a period can be performed more precisely.

Figure 5:
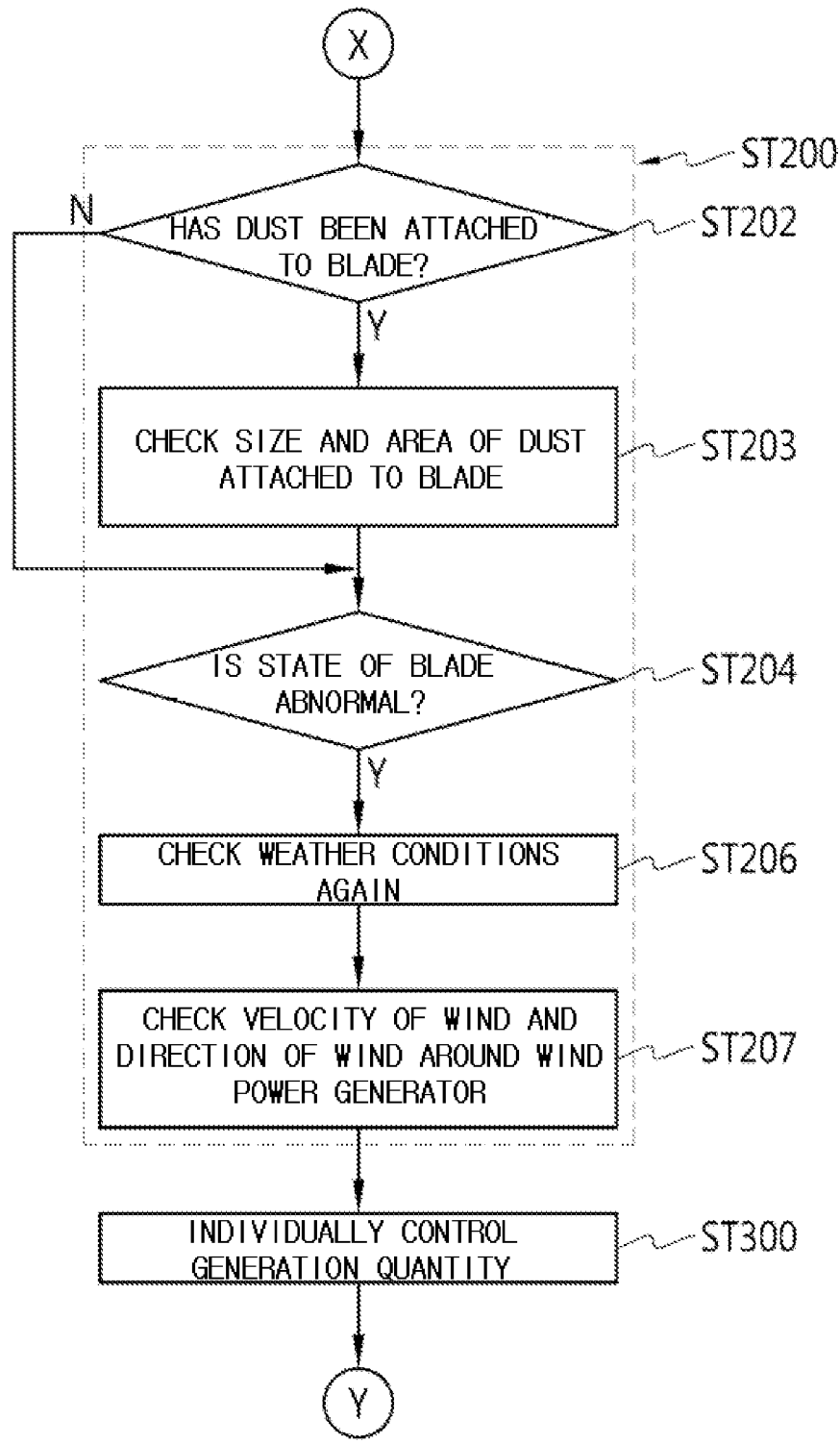
FIG. 5 is a flowchart illustrating a method of controlling the generation output quantity of a wind power plant including a generation quantity reduction factor in accordance with an embodiment of the present disclosure.

Referring to FIGS. 1 and 5, if the generation output quantity of any one of the plurality of wind power generators 1*a* installed in the wind power plant 1 is reduced, the control unit 100 analyzes a generation quantity reduction factor of the wind power generator 1*a* having a reduced generation output quantity at step ST200.

The generation quantity reduction factor includes a reduction in generation output quantity (e.g., the wind power generator 1*a* has a generation quantity smaller than that in a normal state) attributable to external factors other than a mechanical defect or malfunction of the wind power generator 1*a*.

For example, whether or not contaminants have attached to a blade of the wind power generator 1*a* is checked at step ST202. The blade is an element that is useful for controlling and interpreting the generation output of the wind power generator 1*a*. The generation state, for example output quantity, of the wind power generator 1*a* may be changed by the rotation the blade. If contaminants (e.g., dust, insects, or dead birds) are attached to the blade, the rotational velocity of the blade may change from design data for the blade when the blade was initially designed, thereby possibly reducing the generation output quantity of the wind power generator 1*a*.

In order to check whether or not contaminants have been attached to the blade of the wind power generator 1*a*, for example, the wind power plant 1 may be partitioned into a plurality of zones and the attachment degree contaminants for each of the partitioned zones may be compared with each other. In such a case, a different contamination state may be checked in each of the partitioned zones. If the contamination state of the wind power generators 1*a* in a specific zone is different from that of the wind power generators 1*a* in an adjacent zone, a zone where contaminants have occurred is determined to be a contamination generation zone.

In particular, if the wind power plant 1 is installed in a dry climate area, such as the desert, or an area where pollen and sandstorms are frequently generated, a relatively large amount of contaminants may be attached to the blade. Accordingly, whether or not contaminants have been attached to the blade may be checked first.

In order to check whether or not contaminants have attached to the blade at step ST202, a blade contamination detection unit 20 detects the contamination state of the blade. The blade contamination detection unit 20 may send the detected information to the control unit 100 because it is practically difficult for an administrator or a worker to check the plurality of wind power generators 1*a* one by one.

The blade contamination detection unit 20 may include or be provided by a camera unit. The camera unit may be placed at a location spaced apart from the front of the wind power generator 1*a* at a specific distance. The camera unit may be configured to capture an image of the blade in real time and send the image to the control unit 100, which can determine whether or not contaminants have attached to the blade based on the image. The camera unit may include an infrared camera for precisely monitoring the contamination state of the blade even at night in order to check whether or not contaminants have been attached to the blade precisely.

The camera unit may include a tilting unit (not shown) disposed on the lower side of the camera unit to tilt the camera unit at a specific angle in order to photograph the contamination state of a blade of the wind power generator.

For example, if the contaminants attached to the blade are dust, the camera unit checks the size and area of the dust attached to the blade at step ST203. The size and area of the dust may be computed by defining the area of each blade as grids of a lattice form, each having a constant size in both the x direction and the y direction, and computing the size and area of the dust in each of the defined grids using the control unit 100.

If it is determined that contaminants have not attached to the blade, the control unit 100, using a blade state detection unit 30, checks whether or not the rotational velocity of the blade has been reduced, whether or not vibration has been generated in the blade, and whether or not the weight of the blade has increased at step ST204.

The blade state detection unit 30 includes a rotor speed detection sensor (not shown) configured to detect the rotational velocity of the rotor. The rotor speed detection sensor detects the rotational velocity of the rotor and sends the detected rotational velocity to the control unit 100. The control unit 100 compares the rotational velocity of the rotor with a reference rotational velocity and checks whether or not the current rotational velocity of the rotor is in a normal state based on a result of the comparison.

A vibration detection sensor (not shown) detects whether or not vibration has been generated in the blade while the rotor including the blade is rotated. The control unit 100 receives a detection signal detected by the vibration detection sensor and determines whether or not vibration has been generated in the blade.

If it is determined that vibration is generated in the blade, the rotor may be rotating unstably and thus a generation output quantity may be reduced. The control unit 100 determines that such an unstable state corresponds to a generation quantity reduction factor. Furthermore, a weight detection sensor (not shown) installed in the blade detects whether or not the weight of the blade has increased and sends a detection signal to the control unit 100. The control unit 100 determines whether or not the weight of the blade has increased based on the detection signal.

The weight of the blade may be relatively increased, for example, when insects or birds attached to the blade rotate along with the blade because they do not drop to the ground after colliding against the blade. The weight of the blade may also be increased in other ways.

The control unit 100 checks weather conditions around the wind power plant 1 again at step ST206 and checks the velocity of the wind toward the wind power plant 1 and information about the direction of the wind using the weather information server 10 again at step ST207.

For example, if weather conditions around the wind power plant 1 are suddenly changed, the generation output quantity of the wind power generator 1a may be reduced. As an example, if the velocity of the wind toward the wind power generator 1a sharply drops from 10 m/s to 5 m/s, the rotational velocity of the rotor may be relatively decreased. In such a case, a generation quantity reduction factor that leads to a reduction in the generation quantity of the wind power generator 1a is determined to be weather conditions around the wind power plant 1.

In the method of controlling the generation quantity of a wind power plant 1 according to the present embodiment, in order to analyze the generation quantity reduction factor at step ST200, a first sensor 3 configured to detect a reduction of a generation output quantity of the wind power generator 1a may be installed in each of the wind power generators 1a. In other embodiments, the wind power plant 1 may be partitioned into zones, and a second sensor 4 may be installed only in a representative one of the wind power generators 1a disposed in each of the partitioned zones. A generation quantity reduction factor is analyzed using the first and the second sensors 3 and 4.

It is difficult for an administrator or a worker to directly check the operation state of the plurality of wind power generators 1a because the wind power plant 1 occupies a very wide area. Accordingly, the first sensors 3 may be installed in all the wind power generators 1a. The control unit 100 may receive detection signals from the respective first sensors 3, and may check a precise location of a wind power generator 1a whose generation output quantity has been reduced.

The first sensor 3 may include a dust detector configured to check the state of dust that is accumulated on the blade of the wind power generator 1a. The control unit 100 receives dust detection data detected by the dust detector and determines the contamination state around the wind power generator 1a based on the dust detection data.

In the wind power plant 1 according to the present embodiment, the plurality of wind power generators 1a may be partitioned into multiple zones and control may be performed on each of the zones. In such a case, the second sensor 4 may be installed in a representative wind power generator 1a that represents a specific zone. The second sensor 4 may detect a reduction of a generation output quantity of the zone and provide the detected generation quantity reduction state to the control unit 100.

After the generation quantity reduction factor of each wind power generator is analyzed as described above, the wind power generator 1a whose generation output quantity has been reduced is individually controlled in order to increase the generation output quantity of the wind power generator 1a at step ST300.

Figure 3:
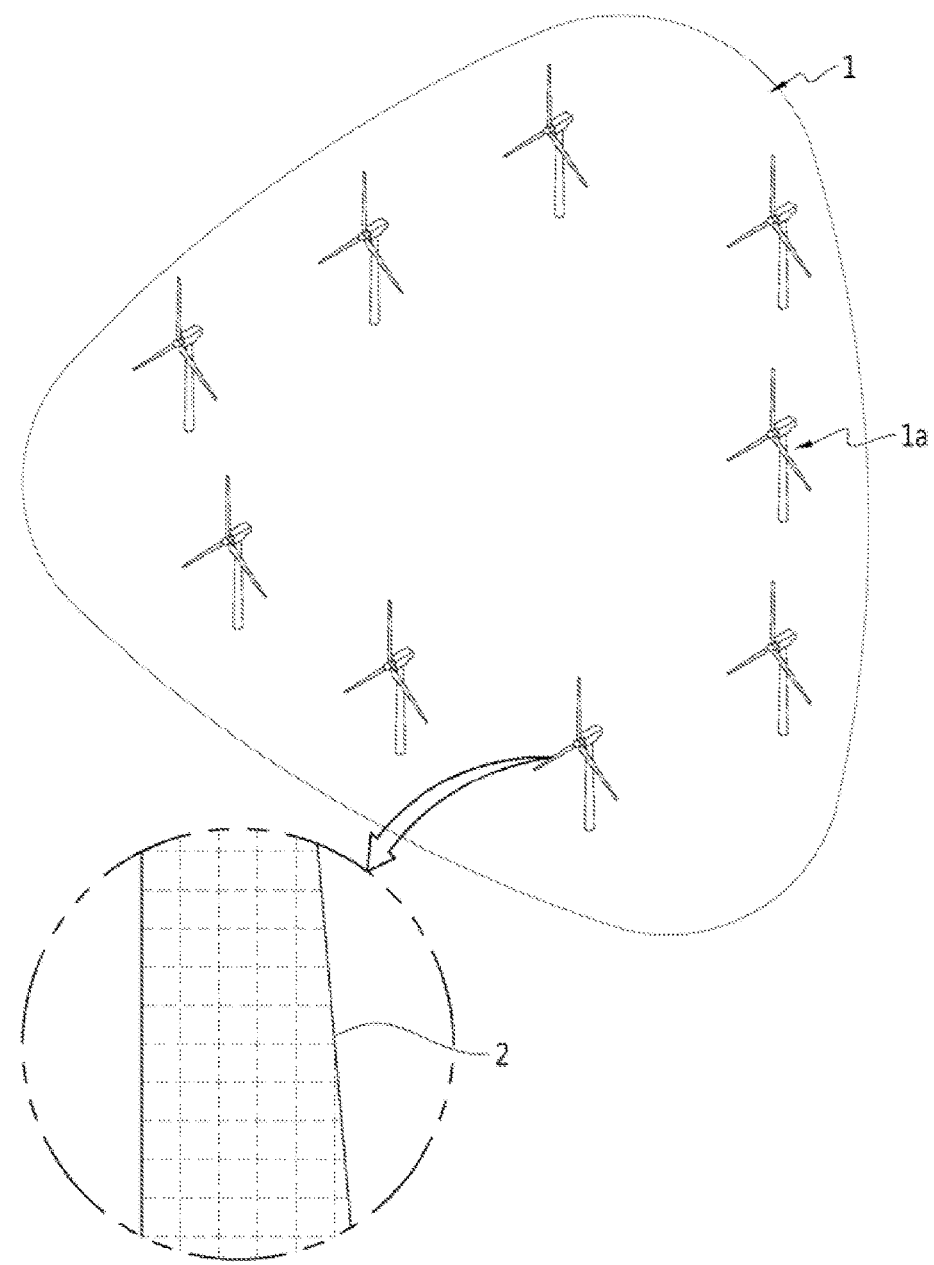
FIG. 3 is a schematic view illustrating a wind power plant in accordance with an embodiment of the present disclosure.
Figure 4:
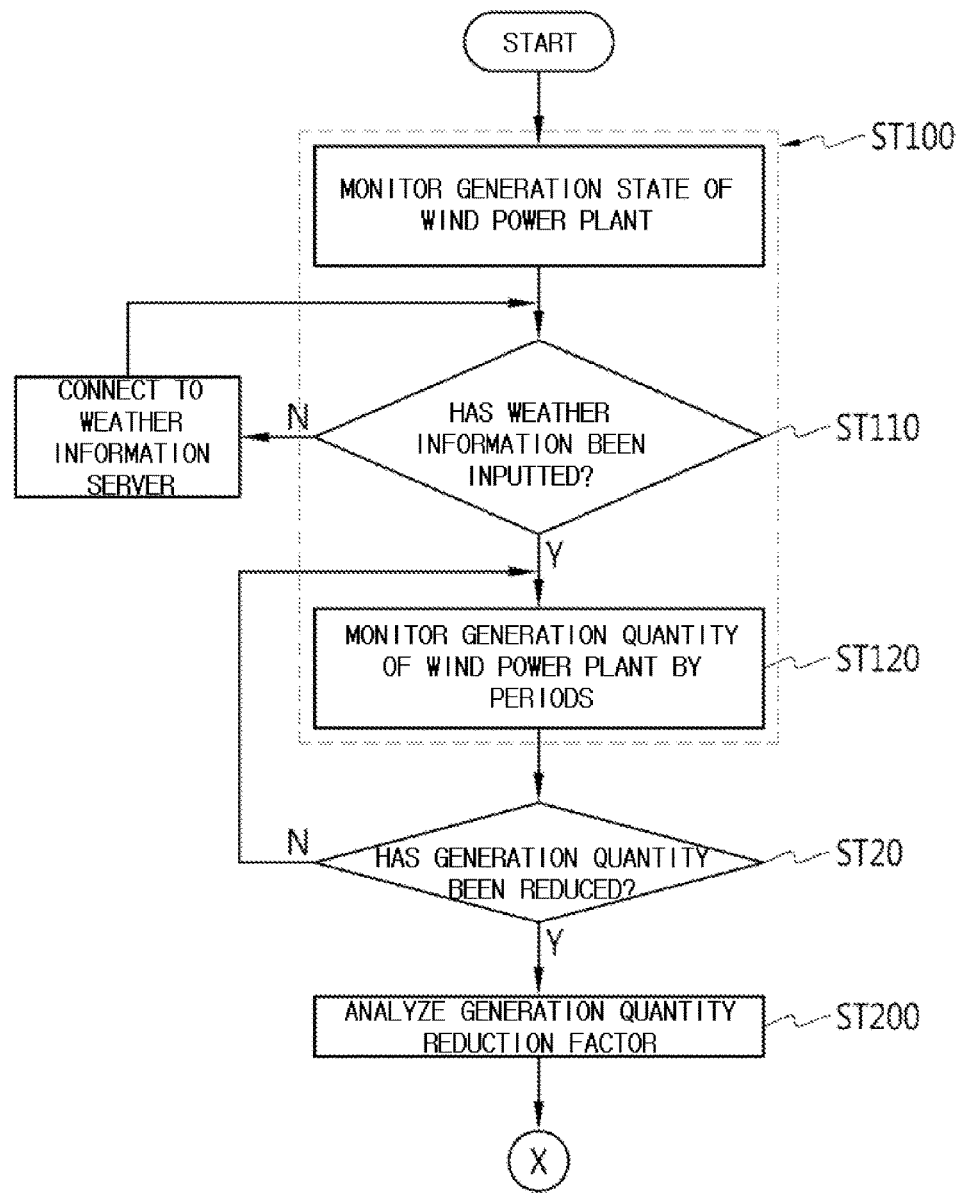
FIG. 4 is a flowchart illustrating a method of controlling the generation output quantity of a wind power plant in order to monitor the generation state in accordance with an embodiment of the present disclosure.
Figure 6:
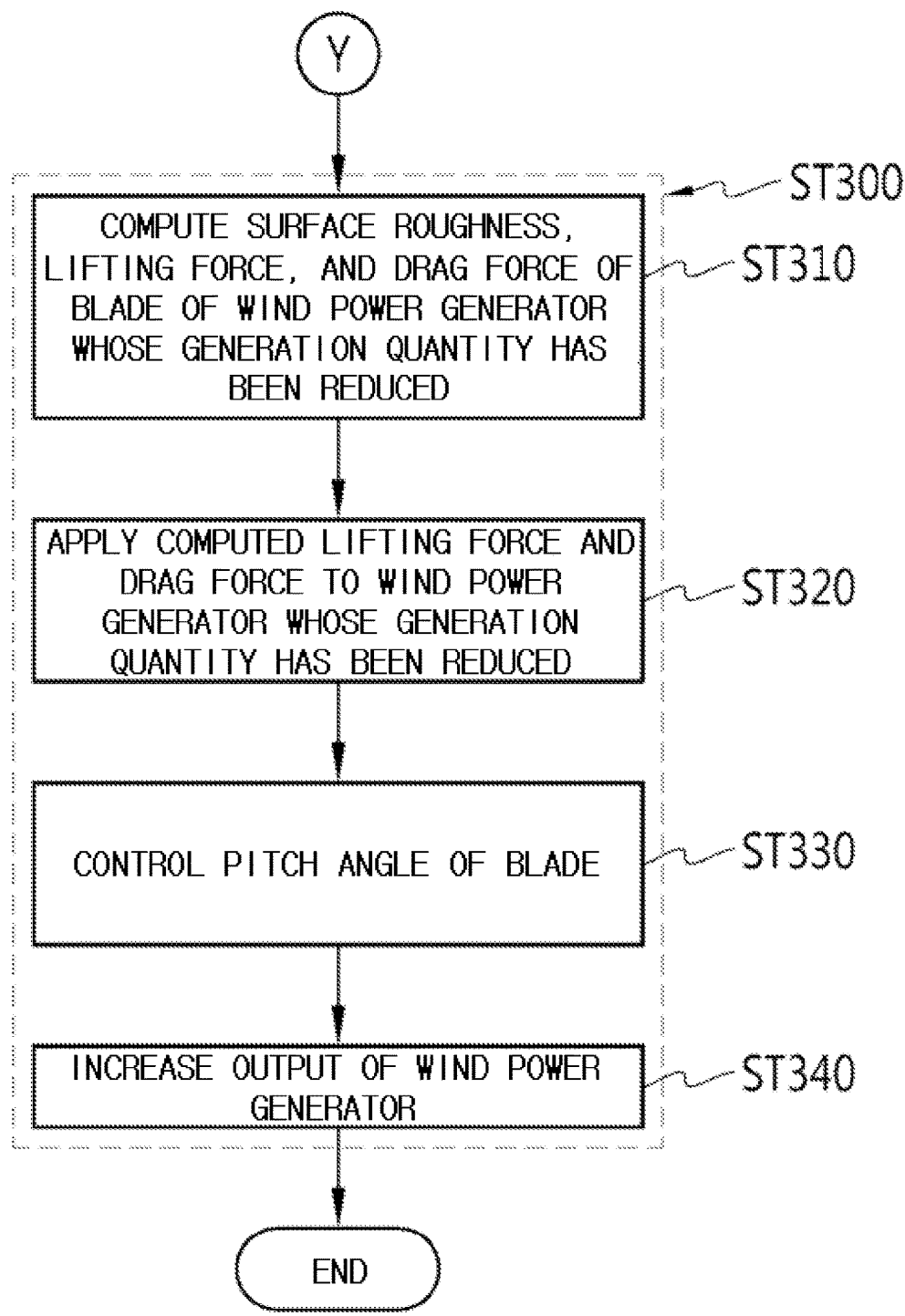
FIG. 6 is a flowchart illustrating a method of controlling the generation output quantity of a wind power plant in order to individually control a generation output quantity in accordance with an embodiment of the present disclosure.

Referring to FIGS. 1, 3 and 6, if dust is attached to the blade and the generation output quantity of the wind power generator 1a is reduced, the surface roughness of the blade of the wind power generator 1a may be changed from an initial surface roughness and the lifting and drag forces of the blade are computed again at step ST310.

If a quantity of dust is accumulated on a surface of the blade, pressure applied to the surface of the blade increases because a flow distribution of air moving along the surface of the blade becomes relatively more irregular than that prior to the accumulation of the dust. Furthermore, a fatigue load at a specific portion of the blade may be increased because the flow of air moving along the surface of the blade is suddenly changed in a turbulent flow form. As a result, the structural strength of the blade may be weakened.

In accordance with an embodiment of the present disclosure, in order to avoid or reduce weakening of the structural strength of the blade and also maintain a stable generation output quantity of the wind power generator 1a, the control unit 100 computes lifting force and drag force again at step ST310 and applies the computed lifting force and drag force to the wind power generator 1a whose generation output quantity has been reduced again at step ST320. Furthermore, the control unit 100 performs pitch control on the blade of the wind power generator 1a whose generation output quantity has been reduced so that the generation output quantity is no longer reduced. In such pitch control, the control unit 100 controls the pitch angle of the blade so that aerodynamic performance is improved beyond that of prior to the attachment of contaminants at step ST330.

The control unit 100 uses one of an automatic method and a manual method in order to control the tilt angle of the blade. If the automatic method is used, the control unit 100 controls the tilt angle of the blade using a link unit 40 or a cylinder unit 50 that is driven by hydraulic pressure.

The control unit 100 according to the present embodiment may control each of the tilt angles of N blades installed in the rotors or control the tilt angles of N blades installed in the rotors at a specific angle at the same time. For example, if first to N-th blades are individually controlled, the generation output quantity of the wind power generator 1*a* may be increased irrespective of whether or not contaminants have attached to each blade by controlling the tilt angles of the blades with consideration taken of the contamination state of each of the blade.

In accordance with the present embodiment, when controlling the generation output quantity of each of the wind power generators 1*a*, the control unit 100 may rotate the blade of the wind power generator 1*a* whose generation output quantity has been reduced by increasing the output of the wind power generator 1*a* at step ST340. In such a case, the rotational velocity of the blade can be improved and thus the generation output quantity of the wind power generator 1*a* can be increased because more current than that before contaminants attached to the blade of the wind power generator 1*a* is applied to a motor (not shown).

In individually controlling the generation quantities of the wind power generators 1*a* at step ST300, the wind power generator 1*a* whose generation output quantity has been reduced is controlled by increasing the rotational velocity of the wind power generator 1*a*. If the generation state of an adjacent wind power generator 1*a* remains in a reference generation quantity over time, the rotational velocity of the wind power generator whose rotational velocity has been increased is controlled in a normal rotational velocity. In such a case, unnecessary power consumption can be reduced, power generation efficiency of the wind power generator can be maintained stably, and thus efficiency of the entire wind power plant 1 can be improved.

A method of controlling the generation quantity of a wind power plant in accordance with another embodiment of the present disclosure is described below with reference to FIGS. 1, 7, and 8.

Figure 7:
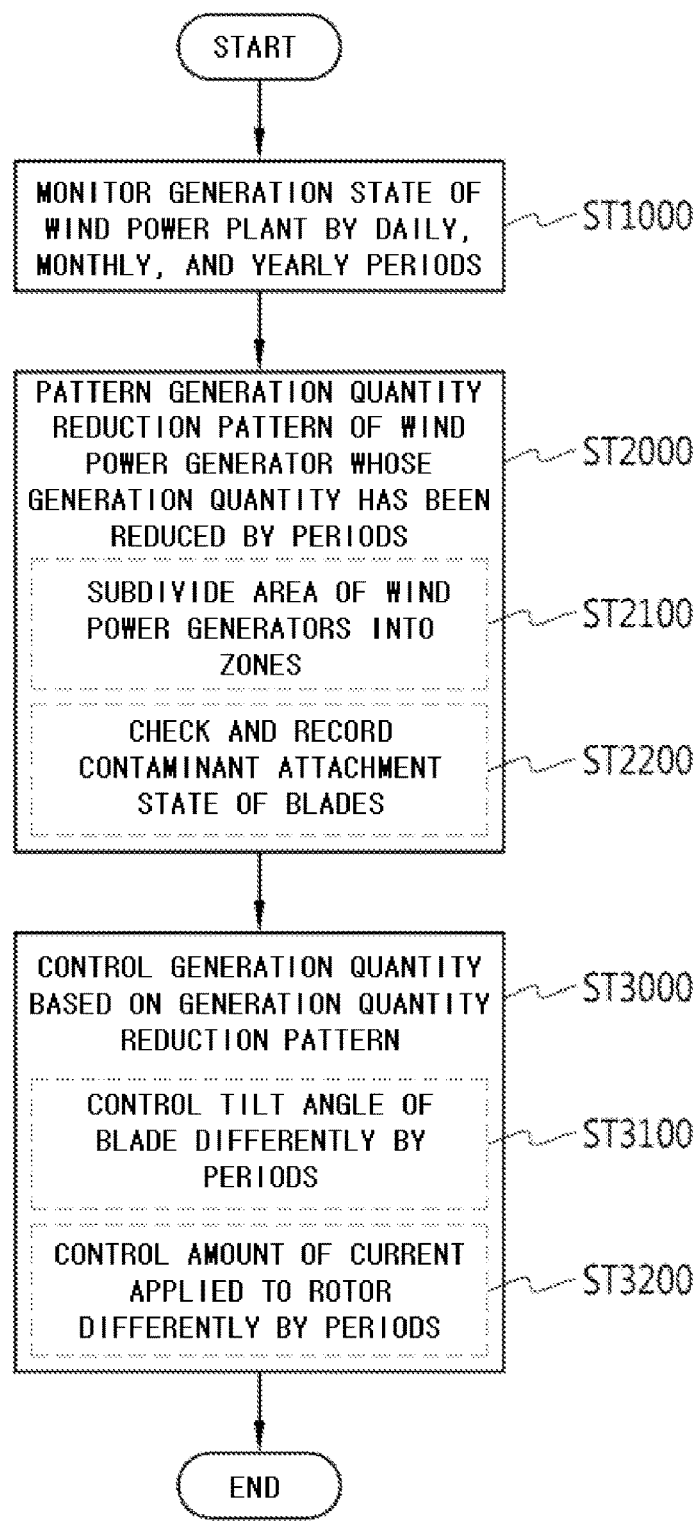
FIG. 7 is a flowchart illustrating a method of controlling the generation output quantity of a wind power plant in accordance with another embodiment of the present disclosure.
Figure 8:
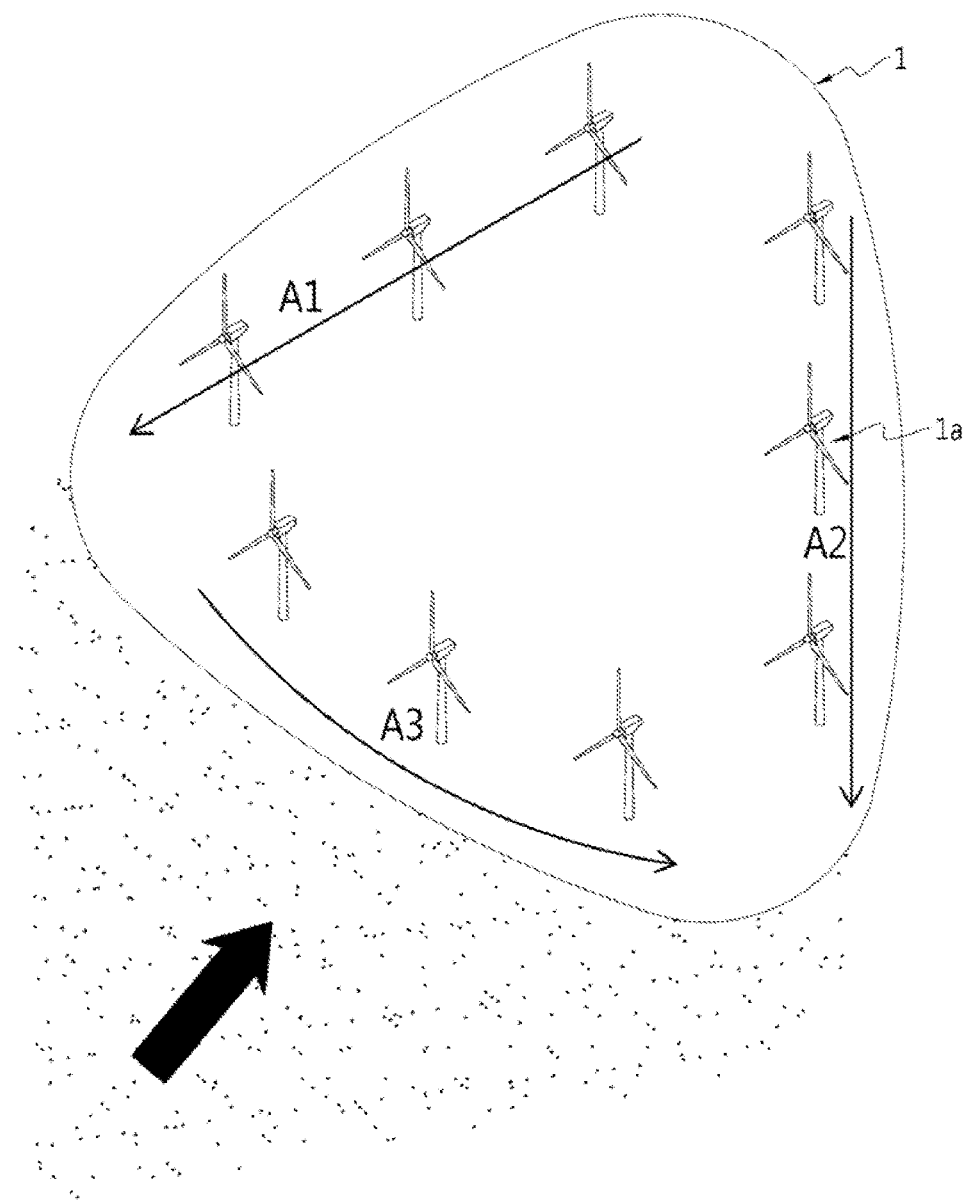
FIG. 8 is a schematic view showing a wind power plant in accordance with another embodiment of the present disclosure.

Referring to FIGS. 1, 7, and 8, unlike in the aforementioned embodiment, in the method of controlling the generation output quantity of a wind power plant according to the present embodiment, the wind power plant 1 is controlled based on a generation quantity reduction pattern of the wind power plant 1 so that the generation output quantity of the wind power plant 1 is increased. For reference, the wind power plant 1 according to the present embodiment is assumed to be installed in a dry climate area including a lot of sand and dust.

More particularly, after the wind power plant 1 is operated, the generation state of the wind power plant 1 may be monitored daily, monthly, and yearly at step ST1000. If the generation output quantity of the wind power plant 1 is reduced entirely or partially, a generation quantity reduction pattern of a wind power generator 1*a* whose generation output quantity has been reduced is subdivided and patterned by time interval at step ST2000. The generation output quantity of the wind power plant 1 is controlled based on the patterned generation quantity reduction pattern so that the generation output quantity is increased at step ST3000.

In general, the generation state of the wind power plant 1 including the plurality of wind power generators 1*a* is relatively reduced over time as compared to that of when the wind power plant 1 was newly installed. The reason why the generation output quantity of the wind power plant 1 is reduced as described above may vary. In the present embodiment, the reason why the generation output quantity of the wind power plant 1 is reduced relates to the location of the wind power plant 1.

For example, if the wind power plant 1 is located in a dry climate area, including a lot of sand and dust, or near the desert, a quantity of dust and foreign substances are introduced into the wind power plant 1. A change of the generation output quantity of the wind power plant 1 is monitored over time under such conditions.

If the generation output quantity of the wind power plant 1 is reduced over time, a generation quantity reduction pattern is subdivided into intervals at step ST2000. In this case, whether or not contaminants have attached to the blades of the wind power generators 1*a* is checked based subdivided zones of the wind power generators 1*a* installed in the wind power plant 1.

For example, the wind power plant 1 may include a plurality of the wind power generators 1*a* placed in zones A1 to A3.

For reference, it is to be noted that the zones of the wind power generators 1*a* have been provided only for easy of understanding and are not limited to the example of FIG. 8.

A plurality of the wind power generators 1*a* are disposed in the zone A1 and a plurality of the wind power generators 1*a* are disposed in the zone A3 although they are installed in the same wind power plant 1. Accordingly, a generation output quantity and the degree of attached contaminants may be different between the plurality of wind power generators 1*a* disposed in the zone A1 and the plurality of wind power generators 1*a* disposed in the zone A3.

That is, a reduction in the generation output quantities of the wind power generators 1*a* or the generation output quantity of the wind power plant 1 is checked in the state in which the area of the plurality of wind power generators 1*a* has been subdivided into the zones A1 to A3 at step ST2100.

Next, after removing dust, that is, contaminants attached to the blades, the contaminant attachment state of the blades is checked at a specific interval, and a change in the contaminants is checked and recorded at step ST2200.

For example, if a sandstorm blows in the direction of the thick arrow in FIG. 8, a quantity of dust may be attached to the blades of the plurality of wind power generators 1*a* placed in the zone A3. In such a case, the dust, that is, contaminants, is removed by cleaning the blades of the wind power generators 1*a* placed in the zone A3. Furthermore, the state of dust attached to the blades of the wind power generators 1*a* placed in the zone A3 and the size and area of the attached dust are stored in the control unit 100 and digitized every 10 days or more frequently.

The contaminants attached to the blades may be removed by workers manually, or may be removed using a contaminant removing unit (not shown) capable of automatically removing the contaminants attached to the blades.

As described above, a change of the contaminants may be computed by defining the area of each blade as grids of a lattice, each having a specific size in the x direction and the y direction, and computing the size and area of each of the defined grids using the control unit 100. Accordingly, when dust is attached to the blade, the size and area of the dust attached to the blade can be computed.

Accordingly, when the state of contaminants attached to the blade and a change of the contaminants attached to the blade are monitored at a specific interval, a specific pattern characteristic regarding the size and area of the contaminants is recorded in the memory 102 of the control unit 100 for each of the wind power generators 1a or each of the zones A1 to A3 in the form of a contamination state over time.

In such a case, the state of contaminants attached to the blades and a change of the contaminants attached to the blades are different between the plurality of wind power generators 1a placed in the zone A1 and the wind power generators 1a placed in the zones A2 and A3. The control unit 100 numerically digitizes and stores a change of the contaminants attached to the wind power generator 1a placed in the zones A1 to the zone A3.

The control unit 100 subdivides and stores a reduction of a generation output quantity according to the date along with a change of contaminants over time. Accordingly, a reduction of the generation output quantity according to the attachment of the contaminants can be reviewed in the form of a graph.

For example, as in the aforementioned embodiment, the blade contamination detection unit 20 (refer to FIG. 1) may check whether or not contaminants have attached to the blade of the wind power generator 1a. A camera unit may be used as the blade contamination detection unit 20. The camera unit is installed at a location a specific distance from the front of the wind power generator 1a and is configured to detect whether or not contaminants have attached to the blade of the wind power generator 1a in real time and to send a detection signal to the control unit 100. A tilting unit (not shown) is disposed on the lower side of the camera unit and is rotated toward the wind power generator 1a at a specific angle.

The control unit 100 controls the generation output quantity of the wind power generator 1a based on a generation output quantity patternized as described above so that the generation output quantity is increased. In the present embodiment, the control unit 100 may control the tilt angle of a blade of the wind power generator la whose generation output quantity has been reduced differently over time at step ST3100, and may control the amount of current applied to the rotor of the wind power generator 1a whose generation output quantity has been reduced differently over time at step ST3200.

For reference, in the present embodiment, the tilt angle of the blade has been illustrated as being controlled, but it is to be noted that any method capable of improving the generation output quantity of the wind power generator 1a whose generation output quantity has been reduced or the wind power plant 1 may be used. Furthermore, in such a case, the basic method of controlling the generation output quantity of the wind power generator 1a whose generation output quantity has been reduced or the wind power plant 1 differently over time may be used.

In controlling the generation output quantity at step ST3000, the control unit 100 controls the generation output quantity in conjunction with yearly weather information about an area where the wind power plant 1 is installed. The weather information may include wind velocity information, temperature information, and humidity information. Control is performed based on the weather information so that power generation efficiency of each of the plurality of wind power generators 1a placed in the wind power plant 1 is improved.

In accordance with the present embodiment, in order to control the tilt angle of a blade of the wind power generator 1a differently over time, the blade of the wind power generator 1a may be sequentially controlled at a first tilt angle after a lapse of a first period, at a second tilt angle after a lapse of a second period, and at a third tilt angle after a lapse of a third period.

Assuming that each of the first period, the second period, and the third period is 10 days, the control unit 100 performs pitch control on the tilt angle of the blade. It is however to be noted that the period may be changed by taking a location where the wind power plant 1 is placed into consideration and is not necessarily limited to 10 days.

Furthermore, the control unit 100 may control the first tilt angle, the second tilt angle, and the third tilt angle differently. In the present embodiment, the angle may be increased from the first tilt angle to the third tilt angle. For example, the first tilt angle of the blade may remain in an initially set state without changing, the second tilt angle may be a change of 5 degrees from the initially set state, and the third tilt angle may be a change of 10 degrees from the initially set state.

Furthermore, in the present embodiment, the control unit 100 may perform control according to the contamination of the blade by differently controlling the rotational velocity of the rotor in addition to the tilt angle of the blade or differently applying the amount of current to the motor.

The control unit 100 patternizes a reduction of the generation output quantity of the wind power plant 1 according to a specific period after the wind power plant 1 is first driven as described above and uses the patternized generation quantity reduction state as a parameter for improving the generation output quantity of the wind power plant 1.

A method of controlling the generation output quantity of the wind power plant 1 in order to control the state in accordance with an embodiment of the present disclosure is described below with reference to FIGS. 1 and 9 to 10.

Figure 9:
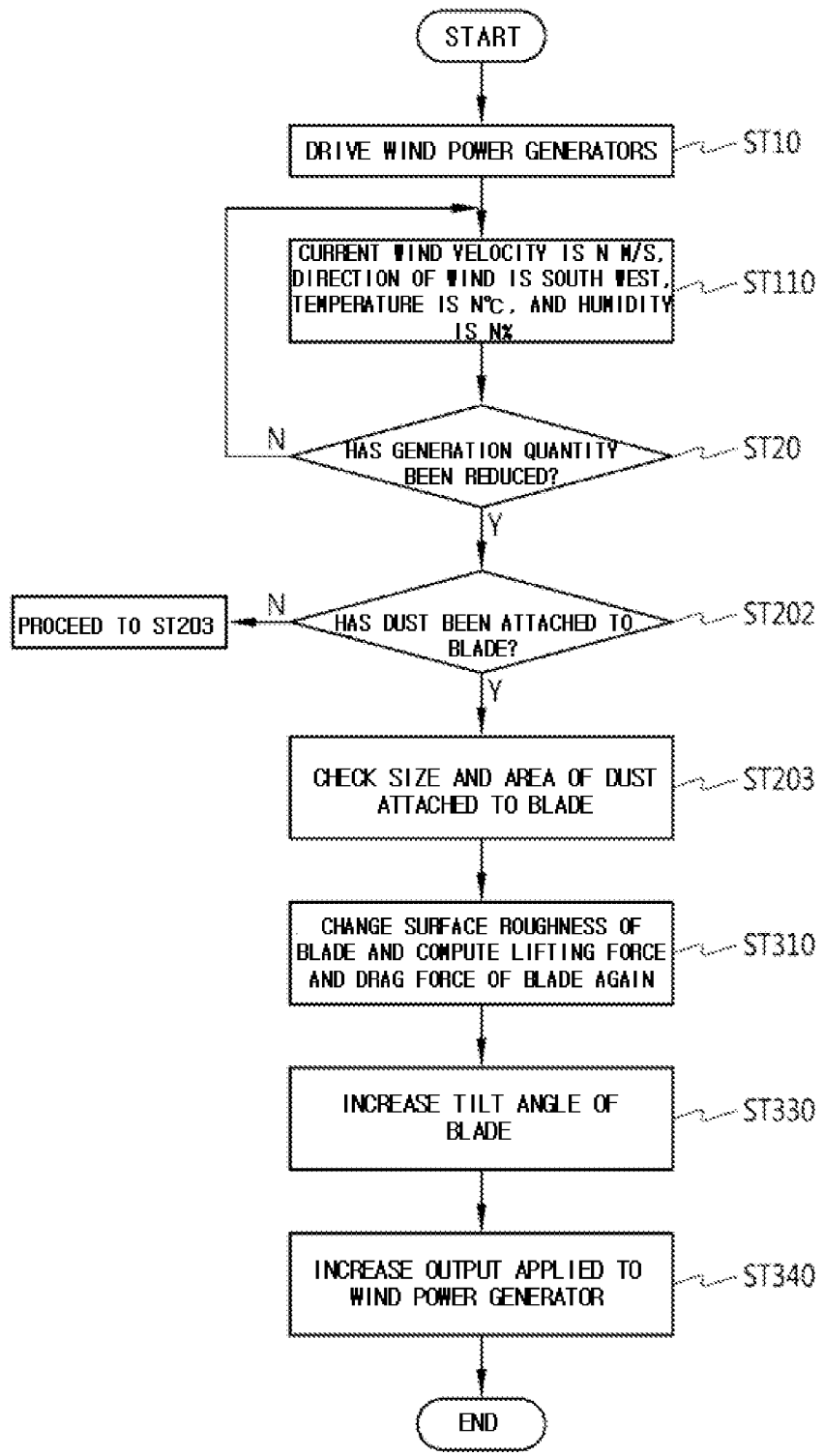
FIG. 9 is a flowchart illustrating a method of controlling the generation output quantity of a wind power plant in order to control an operation state in accordance with an embodiment of the present disclosure.
Figure 10:
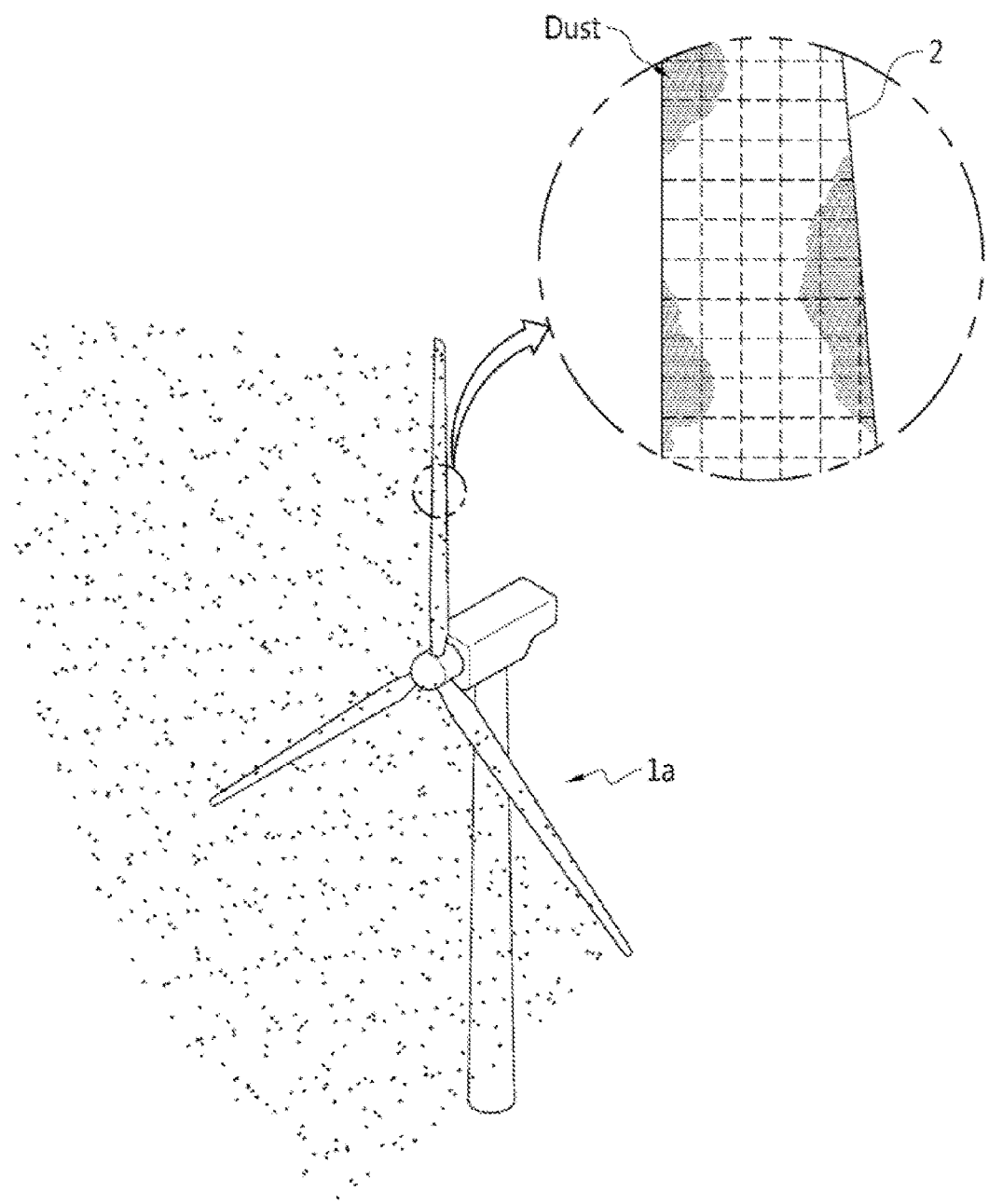
FIG. 10 is a perspective view of a wind power plant in accordance with an embodiment of the present disclosure.
Figure 11:
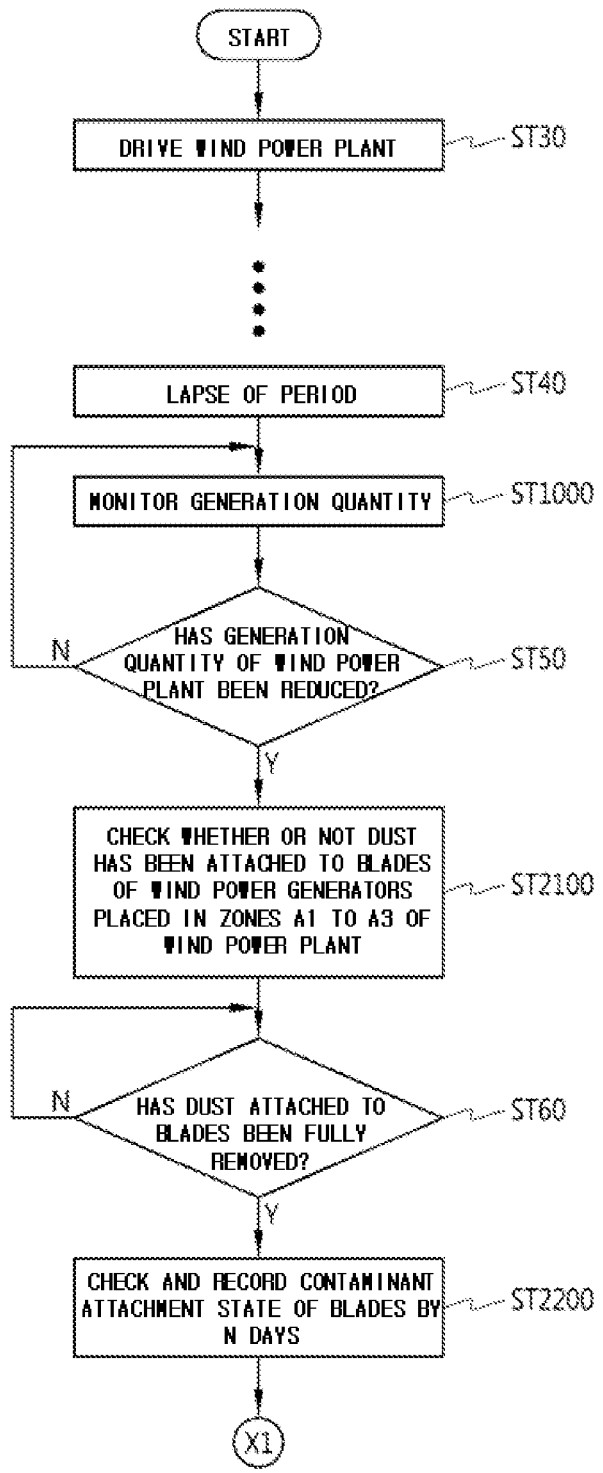
FIGS. 11 and 12 are flowcharts illustrating a method of controlling the generation output quantity of a wind power plant in order to control an operation state in accordance with another embodiment of the present disclosure.
Figure 12:
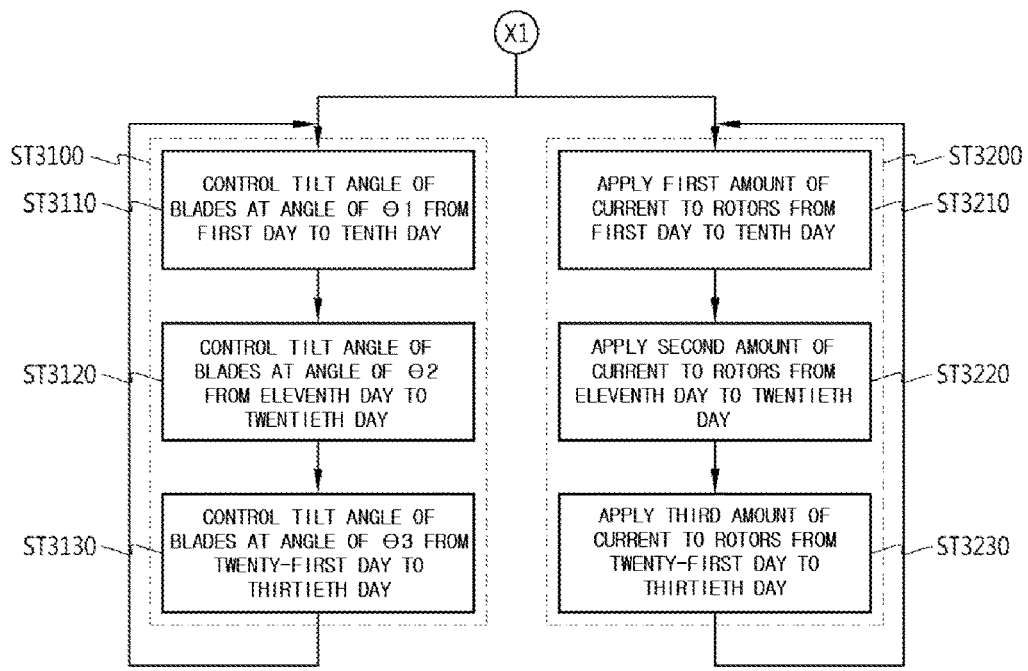

Referring to FIGS. 1 and 9 to 10, when the plurality of wind power generators 1a installed in the wind power plant 1 is driven at step ST10, the control unit 100 receives weather information, including wind velocity, the direction of the wind, temperature, and humidity around the wind power plant 1, from the weather information server 10 and provides the weather information to an administrator at step ST110.

The control unit 100 monitors weather conditions around the wind power plant 1 and at the same time checks the generation output quantity of the wind power plant 1. If it is determined that a quantity of sandstorm or pollen is blown toward the wind power plant 1, the control unit 100 monitors the weather conditions more carefully because the generation output quantity of the wind power generator 1a may be changed.

If it is determined that the generation output quantity of a specific wind power generator 1a has been reduced due to changes in the weather at step ST20, the control unit 100 checks whether or not dust has attached to the blade of the wind power generator 1a whose generation output quantity has been reduced using the blade contamination detection unit 20 at step ST202.

For example, as shown in an enlarged view of FIG. 10, if dust has attached to the blade 2 of the wind power generator 1a, the control unit 100 checks data regarding the size and area of the dust. The area of the blade 2 is partitioned into grids of a lattice form whose outer circumferential surface has the same size. Accordingly, when dust is attached to the blade 2, the control unit 100 may numerically compute the size and area of the dust. An administrator checks the computed size and area of the dust at step ST203 and controls the wind power generator 1a whose generation output quantity has been reduced through the control unit 100.

The control unit 100 changes a parameter representing the surface roughness of the blade 2 based on the computed size and area of the dust, computes lifting force and drag force again for a smoother rotation of the blade 2 at step ST310, and applies the computed lifting force and drag force the wind power generator 1a whose generation output quantity has been reduced.

The lifting force and drag force of the wind power generator 1a that has been contaminated are changed as compared with those of a blade to which the dust is not attached, and thus the rotor of the wind power generator 1a is rotated by the changed lifting force and drag force. For a more smooth rotation, the control unit 100 performs control by increasing a pitch angle so that the tilt angle of the blade 2 is increased at step ST330.

The control unit 100 checks a change of the generation output quantity of the wind power generator 1a and controls the generation output quantity of the wind power generator 1a whose generation output quantity has been reduced so that output of the wind power generator 1a is increased.

A method of controlling the generation quantity of the wind power plant 1 in order to control the state in accordance with another embodiment of the present disclosure is described below with reference to FIGS. 1, 8, and 11 to 12.

Referring to FIGS. 1, 8, and 11 to 12, the wind power plant 1 is driven at step ST30. After a lapse of one or more years at step ST40, the generation output quantity of the wind power plant 1 may be changed. The generation output quantity of the wind power plant 1 is monitored according to the passage of time at step ST1000. The generation state of the wind power plant 1 is monitored daily, monthly, and yearly and is stored in the memory 102 of the control unit 100.

If the generation output quantity of the wind power plant 1 that is monitored as described above is reduced at step ST50, the control unit 100 checks whether or not dust has attached to the blades of the plurality of wind power generators 1a placed in the zones A1 to A3 of the wind power plant 1 every 10 days using the blade contamination detection unit 20 in order to patternize a generation quantity reduction pattern at step ST2100. If, as a result of the check, it is determined that dust has attached to the blades of a plurality of the wind power generators 1a, the dust attached to the blades is removed at step ST60.

Furthermore, the control unit 100 determines whether or not dust is attached to the blades every 10 days and determines what size and area is contaminated during the 10 days if the detection signal is provided by the blade contamination detection unit 20.

If the blades to which the dust has been attached are rotated and the degree of contamination on the surfaces of the blades increases over time, the control unit 100 stores the degree of contamination as numerical data or image data according to the date. In this case, the control unit 100 also stores a reduction of the generation output quantity of each of the wind power generators 1a or the entire wind power plant 1 according to the size and area of the dust based on the date and digitalizes and stores both the degree of contamination and the reduction of the generation output quantity at step ST2200.

For example, the control unit 100 may digitalize and store the size and area of dust every day after the dust first detected attached to the blade. A method of digitalizing the size and area of the dust has been described in connection with the aforementioned embodiments, and a detailed description thereof is omitted.

In order to control the generation output quantity of the wind power plant 1 based on data stored as described above so that the generation output quantity is increased, the control unit 100 may control the tilt angles of blades of the plurality of wind power generators 1a, placed at the location A3 including a reduced generation output quantity, at an angle of θ1 from the first day to the tenth day, monitor and record a change of the generation output quantity of the wind power plant 1 at step ST3110, control the tilt angles of blades of the plurality of wind power generators 1a at an angle of θ2 from the eleventh day to the twentieth day at step ST3120, control the tilt angles of blades of the plurality of wind power generators 1a at an angle of θ3 from the twenty-first day to the thirtieth day, monitor the generation output quantity of the wind power plant 1 at step ST3130, and then check whether or not the generation output quantity of the wind power plant 1 is increased.

In accordance with the present embodiment, the control unit 100 may increase the generation output quantity of the wind power plant 1 by controlling the tilt angles of blades of the plurality of wind power generators 1a, placed at the location A3 including a reduced generation output quantity, as described above. At the same time, the control unit 100 may apply a first amount of current to the rotors from the first day to the tenth day, monitor and record a change of the generation output quantity of the wind power plant 1 at step ST3210, apply a second amount of current higher than the first amount of current to the rotors from the second day to the twentieth day, monitor and record a change of the generation output quantity of the wind power plant 1 at step ST3220, apply a third amount of current higher than the second amount of current to the rotors from the twenty-first day to the thirtieth day, monitor and record a change of the generation output quantity of the wind power plant 1 at step ST3230, and then check whether or not the generation output quantity of the wind power plant 1 is increased.

The method of increasing the generation output quantity of the wind power plant 1 according to the present embodiment may be combined and used with other methods along with the methods of controlling the tilt angles of the blades and the amount of current applied to the rotors in order to increase the generation output quantity of the wind power plant 1. In such a case, in order to increase the generation output quantity of the wind power plant 1, the control unit 100 may monitor and record a change of the generation output quantity over time, and may control the generation output quantity of the entire wind power plant 1 or each of the wind power generators 1a differently over time.

In accordance with the embodiments of the present disclosure, power generation efficiency can be stably maintained through stable power generation irrespective of the passage of time using a generation quantity reduction pattern of the wind power plant according to the passage of time as a control parameter.

Furthermore, the generation output quantity of a wind power plant can be increased by controlling each of wind power generators based on a factor that reduces the generation output quantity if the generation output quantity of the wind power generator is reduced.

The embodiments of the present disclosure have been disclosed above for illustrative purposes. Those skilled in the art will appreciate that various modifications, additions and substitutions are possible, without departing from the scope and spirit of the invention as disclosed in the accompanying claims.

While the present disclosure has been particularly shown and described with reference to exemplary embodiments thereof, it will be understood by those of ordinary skill in the art that various changes and modifications may be made therein without departing from the technical idea and scope of the present disclosure and such changes and modifications belong to the claims of the present disclosure. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of controlling a wind power plant that includes a plurality of wind power generators, the method comprising:
    monitoring a generation state of the wind power plant to detect a reduced output wind power generator, among the plurality of wind power generators, having a generation quantity smaller than a reference value;
    in response to detecting the reduced output wind power generator having the generation quantity smaller than the reference value, capturing an image of a blade of the reduced output wind power generator using a camera disposed at a specific distance from the reduced output wind power generator in order to determine a size and area of contamination of the blade and analyze a generation quantity reduction factor of the detected wind power generator; and
    individually controlling the generation output quantity of the reduced output wind power generator based on the analyzed generation quantity reduction factor so that the generation output quantity is increased,
    wherein monitoring a generation state of the wind power plant includes
        detecting a reduction of the generation output quantity of the detected wind power generator using a plurality of first sensors respectively installed in each of the wind power generators, each first sensor including a dust detector configured to
            check a state of dust accumulation on the blade of a corresponding wind power generator of the plurality of wind power generators and
            output dust detection data and location information of a corresponding wind power generator in order to determine a contamination state around the corresponding wind power generator; and
        partitioning the wind power plant into zones and detecting a reduction of the generation output quantity of the detected wind power generator using a plurality of second sensors respectively installed in a representative wind power generator of each of the zones to detect the reduction of the generation output quantity of the corresponding zone.

2. The method of claim 1, wherein monitoring the generation state of the wind power plant includes:
    receiving current weather information about an area where the wind power plant is placed and weather information after an elapsed time period; and
    monitoring a generation quantity of the wind power plant over time based on the received weather information.

3. The method of claim 2, wherein monitoring the generation state of the wind power plant further includes:
    partitioning the wind power plant into zones,
    subdividing a generation state of each of the zones into yearly, monthly, and weekly units, and
    monitoring the generation state at daytime and at night.

4. The method of claim 1, further comprising:
    checking whether or not a rotational velocity of the blade has been reduced,
    checking whether or not vibration has been generated in the blade,
    checking whether or not a weight of the blade has increased, and
    checking weather conditions around the wind power plant.

5. The method of claim 1, further comprising partitioning the wind power plant into a plurality of zones and comparing attachment degrees of the contaminants in the zones with each other.

6. The method of claim 1, further comprising determining that the contaminants have attached to the blade are dust, wherein the capturing an image includes determining a size and area of dust attached to the blade.

7. The method of claim 4, wherein checking the weather conditions around the wind power plant includes checking a wind velocity and a wind volume around the reduced output wind power generator.

8. The method of claim 1, wherein individually controlling the generation output quantity of the reduced output wind power generator comprises:
    changing a parameter representing surface roughness of a blade of the reduced output wind power generator and computing lifting force and drag force;
    applying the computed lifting force and drag force to the reduced output wind power generator; and
    controlling a tilt angle of the blade of the reduced output wind power generator.

9. The method of claim 1, wherein individually controlling the generation output quantity of the reduced output wind power generator includes rotating a blade of the reduced output wind power generator to increase output of the wind power generator.

10. The method of claim 1, wherein individually controlling the generation output quantity of the reduced output wind power generator includes
    controlling the generation output quantity by increasing a rotational velocity of the wind power generator for a specific period, and
    controlling the increased rotational velocity of the wind power generator if a generation state of an adjacent wind power generator maintains a reference generation output quantity after a time period has elapsed.

11. The method of claim 8, wherein controlling the tilt angle of the blade includes controlling the tilt angle of the blade using an automatic method or a manual method.

12. A controller for controlling a wind power plant that includes a plurality of wind power generators, the controller configured to:
monitor a generation state of the wind power plant to detect a reduced output wind power generator, among the plurality of wind power generators, having a generation quantity smaller than a reference value;
in response to detecting the reduced output wind power generator having the generation quantity smaller than the reference value, capture an image of a blade of the reduced output wind power generator using a camera disposed at a specific distance from the reduced output wind power generator in order to determine a size and area of contamination of the blade and analyze a generation quantity reduction factor of the detected wind power generator; and
individually control the generation output quantity of the reduced output wind power generator based on the analyzed generation quantity reduction factor so that the generation output quantity is increased,
wherein the controller is further configured to monitor a generation state of the wind power plant by
detecting a reduction of the generation output quantity of the detected wind power generator using a plurality of first sensors respectively installed in each of the wind power generators, each first sensor including a dust detector configured to
check a state of dust accumulation on the blade of a corresponding wind power generator of the plurality of wind power generators and
output dust detection data and location information of a corresponding wind power generator in order to determine a contamination state around the corresponding wind power generator; and
partitioning the wind power plant into zones and detecting a reduction of the generation output quantity of the detected wind power generator using a plurality of second sensors respectively installed in a representative wind power generator of each of the zones to detect the reduction of the generation output quantity of the corresponding zone.

13. A system for controlling a wind power plant that includes a plurality of wind power generators, the system comprising a controller configured to:
monitor a generation state of the wind power plant to detect a reduced output wind power generator, among the plurality of wind power generators, having a generation quantity smaller than a reference value;
in response to detecting the reduced output wind power generator having the generation quantity smaller than the reference value, capture an image of a blade of the reduced output wind power generator using a camera disposed at a specific distance from the reduced output wind power generator in order to determine a size and area of contamination of the blade and analyze a generation quantity reduction factor of the detected wind power generator; and
individually control the generation output quantity of the reduced output wind power generator based on the analyzed generation quantity reduction factor so that the generation output quantity is increased,
wherein the controller is further configured to monitor a generation state of the wind power plant by
detecting a reduction of the generation output quantity of the detected wind power generator using a plurality of first sensors respectively installed in each of the wind power generators, each first sensor including a dust detector configured to
check a state of dust accumulation on the blade of a corresponding wind power generator of the plurality of wind power generators and
output dust detection data and location information of a corresponding wind power generator in order to determine a contamination state around the corresponding wind power generator; and
partitioning the wind power plant into zones and detecting a reduction of the generation output quantity of the detected wind power generator using a plurality of second sensors respectively installed in a representative wind power generator of each of the zones to detect the reduction of the generation output quantity of the corresponding zone.

* * * * *